(12) United States Patent
Oliver (10) Patent No.: US 7,324,450 B2
(45) Date of Patent: Jan. 29, 2008

(54) METHOD AND APPARATUS FOR PROGRAMMING A FUNCTIONALITY OF AN INTEGRATED CIRCUIT (IC)

(75) Inventor: Delton John Oliver, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 1193 days.

(21) Appl. No.: 10/404,784

(22) Filed: Mar. 31, 2003

(65) Prior Publication Data

US 2004/0190558 A1    Sep. 30, 2004

(51) Int. Cl.
*H04L 1/00* (2006.01)
(52) U.S. Cl. .................. 370/235; 709/208
(58) Field of Classification Search ......... 370/235, 370/229, 232, 252; 709/208, 209, 233; 705/77
See application file for complete search history.

(56) References Cited

U.S. PATENT DOCUMENTS 5,737,422 A    4/1998 Billings
5,784,598 A *  7/1998 Griffith ................. 713/501
5,826,092 A * 10/1998 Flannery ................ 713/324
5,987,614 A   11/1999 Mitchell et al.
6,272,646 B1   8/2001 Rangasayee et al.
2002/0007463 A1  1/2002 Fung

FOREIGN PATENT DOCUMENTS

JP          10 312370 A    11/1998
WO  PCT/US2004/005051      2/2004

* cited by examiner

*Primary Examiner*—Brenda Pham
(74) *Attorney, Agent, or Firm*—Blakely, Sokoloff, Taylor & Zafman LLP (57) ABSTRACT

Method and apparatus for remotely programming a functionality of an integrated circuit (IC) are described herein. In one aspect, exemplary method includes receiving a command for enabling a functionality of an integrated circuit (IC) from a remote facility over a network, and enabling the functionality of the IC in response to the command. Other methods and apparatuses are also described.

28 Claims, 8 Drawing Sheets

METHOD AND APPARATUS FOR PROGRAMMING A FUNCTIONALITY OF AN INTEGRATED CIRCUIT (IC)

FIELD

Embodiments of the invention relate to the field of an integrated circuit (IC); and more specifically, to a remote programmable IC.

BACKGROUND

A microprocessor, also known as a CPU (central processing unit), is a complete computation engine that controls a computer. Currently, internal CPU clocks speeds are fixed at the manufacturing facility via an internal fuse setting. These CPU speed settings cannot be changed after initial manufacture, test, and packaging. A large percentage of processors may be able to execute at its maximum clock speed capability. However, higher clock speeds may be charged for a premium price by a respective vendor. To enable lower cost effective CPUs in the market without cannibalizing the higher performance market segments, vendors tend to force slower speeds on devices that are fully capable of running at much higher speeds for markets that cannot justify a higher performance cost premium.

Many "new" market segments currently cannot justify the cost of the higher performance devices. In addition, many of those devices tend to have long life cycles (e.g., 5-6 years or more) and once they are deployed, the devices may not realistically and/or economically be returned for upgrade purposes. The fact that these markets are "new" often equates, initially, to limited sophistication and thus performance requirements. An end user may not be willing to pay for sophistication and its associated performance increase, performance increase that they don't yet know they need. However, it is understood that as the consumer slowly becomes more and more sophisticated, the demand for more services and thus performance will increase, along with the end user's willingness to pay for increased performance.

As a result, customers are caught in a predicament. They are deploying millions of devices of a 5-6 year product life cycle and those devices cannot be realistically returned for upgrade. Those devices may have minimal performance requirements today and may have dramatically increased performance requirements tomorrow. Evidence of this predicament is manifested by demands for high performance devices with low performance pricing.

BRIEF DESCRIPTION OF THE DRAWINGS

The invention may best be understood by referring to the following description and accompanying drawings that are used to illustrate embodiments of the invention. In the drawings.

DETAILED DESCRIPTION

Methods and apparatuses to remotely program a clock speed of an integrated circuit (IC) are described. According to one embodiment, the exemplary apparatus includes an adjustable phase-lock-loop (PLL) circuit that controls the clock speed of the IC. Adjustments to the PLL may be gated by a decryption engine and an internally supplied set of speed keys. An access counter may be employed to gate all accesses to the speed keys. According to one embodiment, if more than a predetermined number of unsuccessful access attempts are made, the capability to program the clock speed may be disabled.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
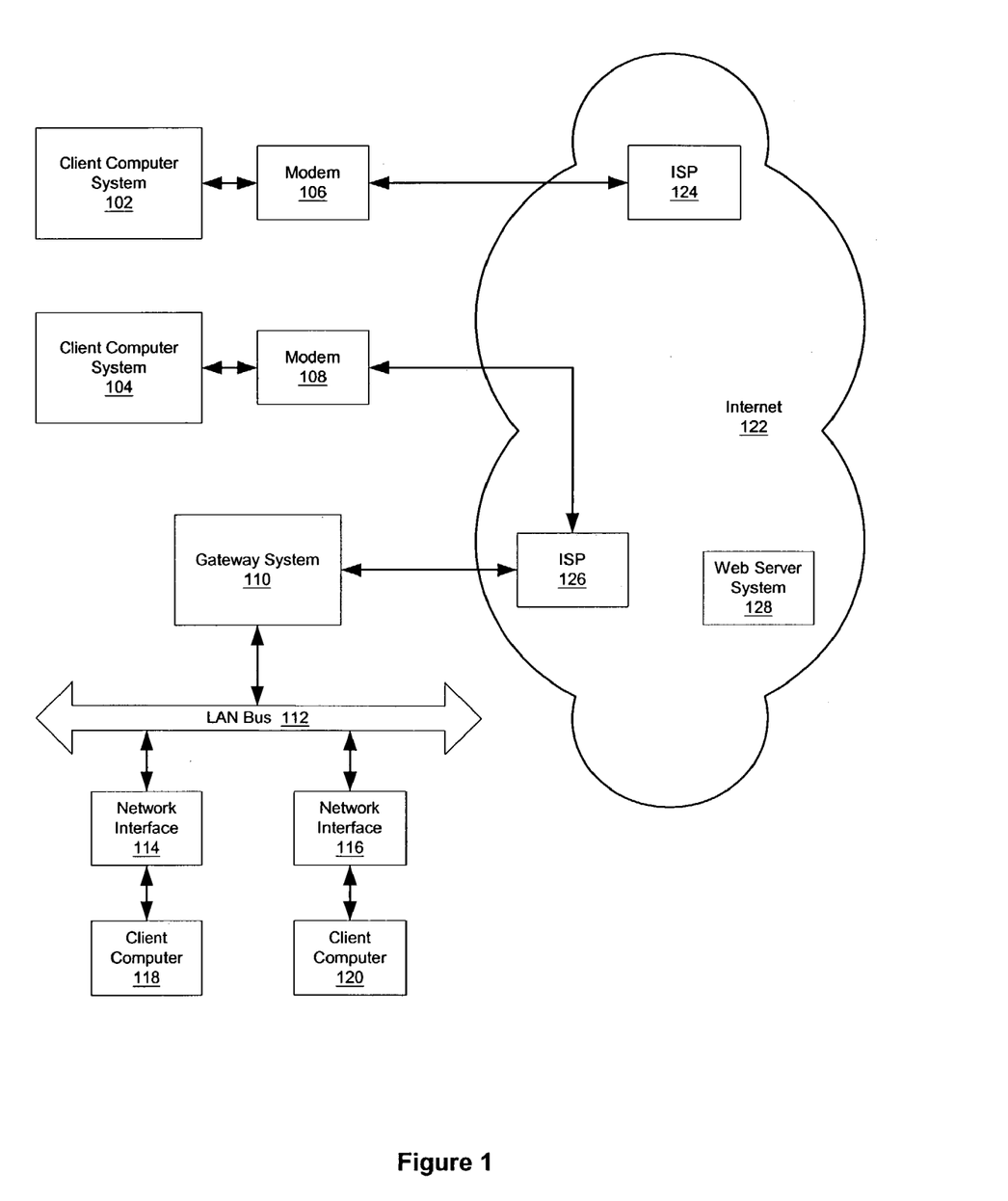
FIG. 1 illustrates a block diagram of a network of computer systems which may be used with one embodiment.

FIG. 1 is a diagram of a network of computer systems in which a client computer may be remotely programmed its clock speed of a microprocessor, according to one embodiment of the invention. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in an Intranet within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128. In the case of remote storage, the data may be transferred as a file (e.g., download) and then displayed (e.g., in a window of a browser) after transferring the file. In another embodiment, the document presentation may be stored locally at the client computer systems 102, 104, 118, and/or 120. In the case of local storage, the client system may retrieve and display the document via an application, such as a word processing application. Without requiring a network connection.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML document (e.g., Web pages), which may be provided by the Web server 128. The client computer may incorporate an application in accordance with one embodiment of the invention, to allow a user to interact with a vendor facility and download a remote command to program the clock speed of an IC (e.g., a microprocessor) of the client machine.

The ISP 124 provides Internet connectivity to the client computer system 102 via a modem interface 106, which may be considered as part of the client computer system 102. The client computer systems 102, 104, 118, and 120 may be a conventional data processing system, such as a computer having a Pentium microprocessor available from Intel Corporation, a "network" computer, a handheld/portable computer, a cell phone with data processing capabilities, a Web TV system, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

Figure 2:
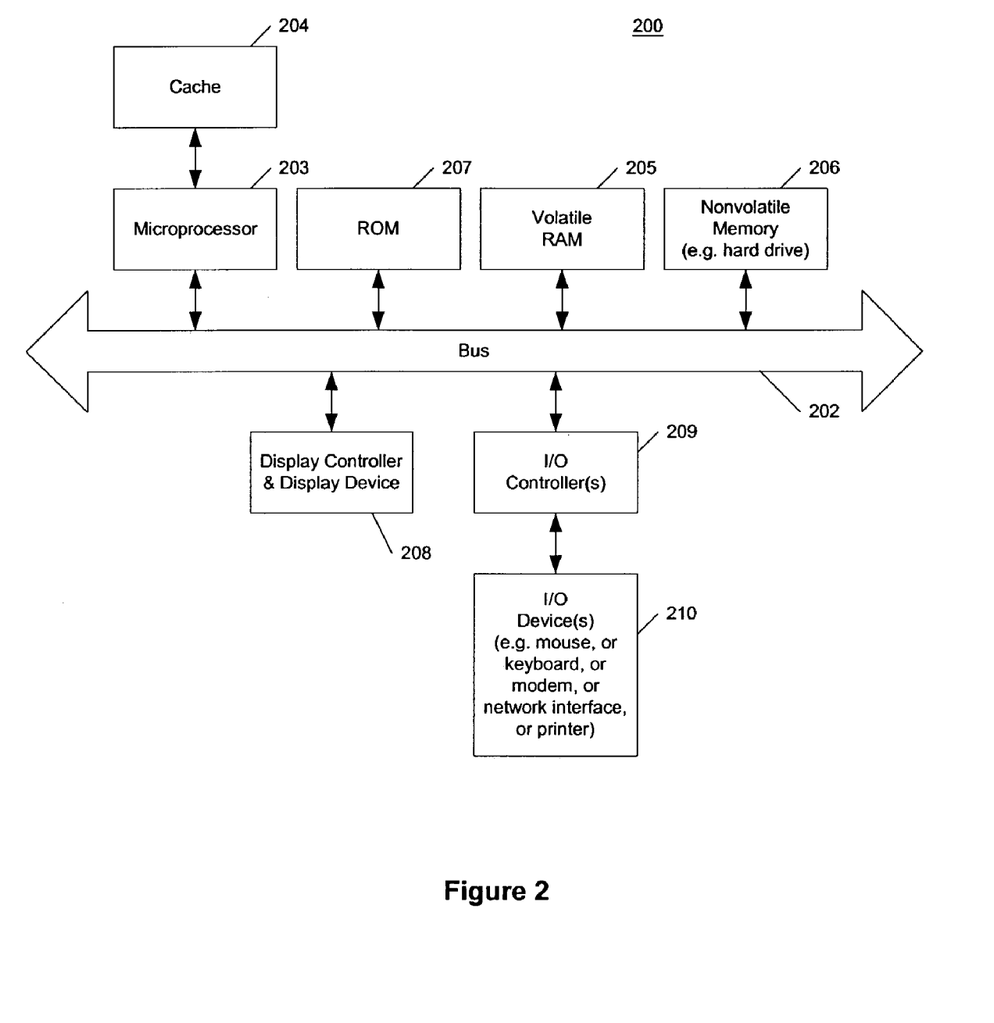
FIG. 2 illustrates a block diagram of a computer system which may be used with one embodiment.

FIG. 2 is a block diagram of a digital processing system which may be used with one embodiment of the invention. For example, the system 200 shown in FIG. 2 may be used as a client computer system (e.g., the client computer systems 102, 104, 118, and/or 120), a Web server system (e.g., the Web server system 128), or a conventional server system, etc. Furthermore, the digital processing system 200 may be used to perform one or more functions of an Internet service provider, such as the ISP 124 and 126.

Note that while FIG. 2 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 2 may, for example, be an IBM compatible computer or an Apple Macintosh computer.

As shown in FIG. 2, the computer system 200, which is a form of a data processing system, includes a bus 202 which is coupled to a microprocessor 203 and a ROM 207, a volatile RAM 205, and a non-volatile memory 206. The microprocessor 203, which may be a Pentium microprocessor from Intel Corporation or a PowerPC G3 or PowerPC G4 microprocessor from Motorola, Inc., is coupled to cache memory 204 as shown in the example of FIG. 2. The bus 202 interconnects these various components together and also interconnects these components 203, 207, 205, and 206 to a display controller and display device 208, as well as to input/output (I/O) devices 210, which may be mice, keyboards, modems, network interfaces, printers, and other devices which are well-known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive; a magnetic optical drive, an optical drive, or a DVD RAM or other type of memory system which maintains data even after power is removed from the system. Typically the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

Figure 3:
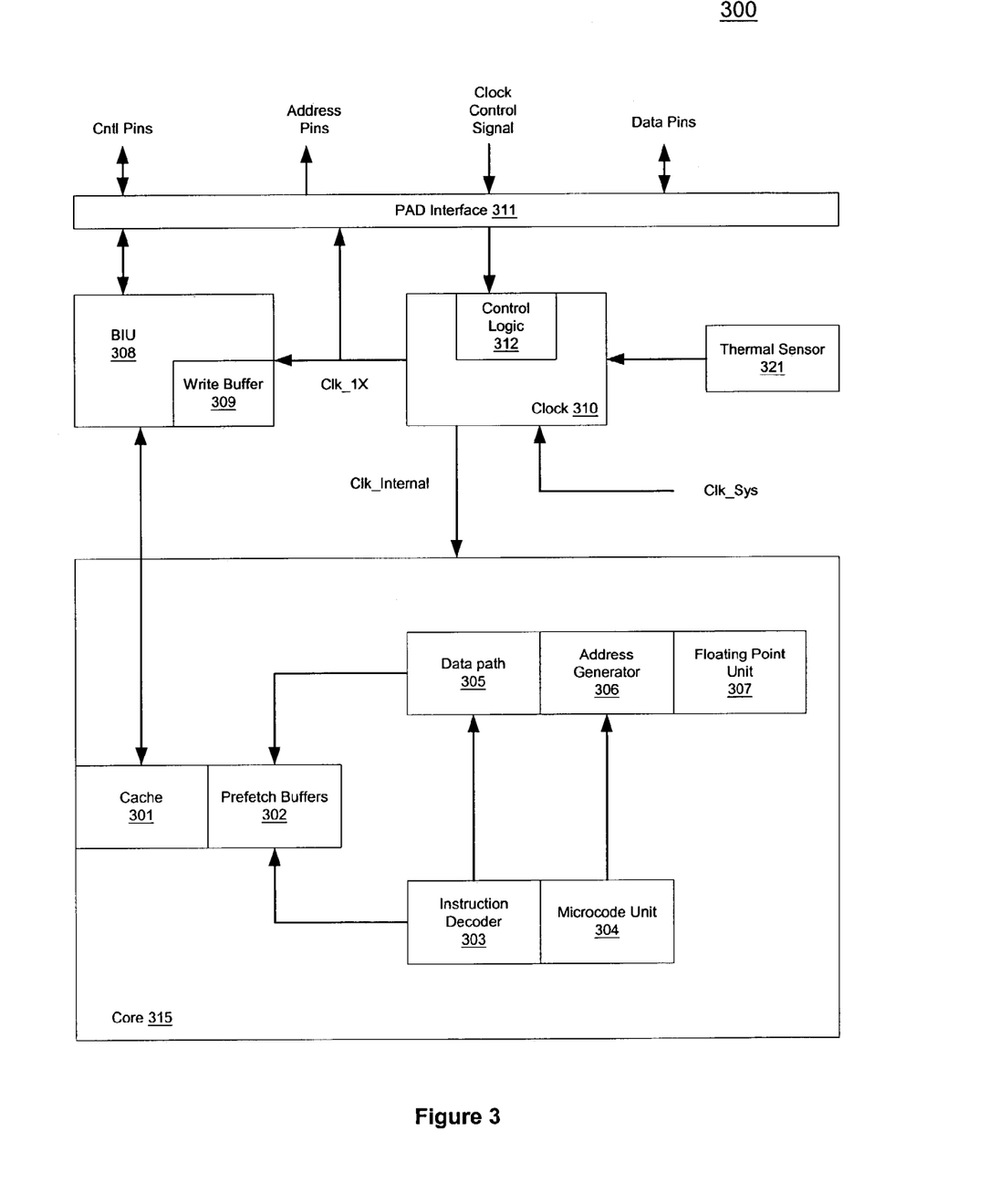
FIG. 3 illustrates a block diagram of a processor in accordance with one embodiment.

FIG. 3 is a block diagram illustrating an embodiment of a microprocessor whose clock speed or a functionality may be remotely programmed over a network. In one embodiment, microprocessor 300 includes a processing core 315 that processes data of a computer system, such as computer system 200 of FIG. 2. Core 315 includes a cache 301, prefetch buffers 302, an instruction decoder 303, a microcode unit 304, datapath circuitry 305, an address generator 306 and a floating point unit 307. Cache 301 may store instructions and data for execution by microprocessor 300. Cache 301 may be remotely programmed (e.g., enabled) by a command received from a remote facility over a network, such as, Internet 122 of FIG. 1. A portion of microprocessor 300, such as a portion of core logic 315, may also be programmed or enabled remotely by a command received from a remote facility over a network. Prefetch buffers 302 may retrieve data and instructions for execution by microprocessor 300. Buffers 302 may retrieve the data and instructions either from cache 301 or if a cache miss occurs, from a memory of the computer system via a bus interface unit 308.

Instruction decoder 303 retrieves and decodes the instructions from the prefetch buffers 302. Microcode unit 304 has a memory that stores microcode instructions for microprocessor 300. Microcode unit 304 interacts with the instruction decoder 303 to execute the instructions. To carry out execution of the instructions, microcode unit 304 provides address generator 306 with address information which address generator 306 uses to generate addresses necessary to carry out the execution of the instructions. In a similar manner, address generator 306 generates addresses for datapath circuitry 305 and floating point unit 307.

Microcode unit 304 is also responsible for instruction boundary processing, such as interrupt/exception arbitration, and the halting of instruction decoder 303 when necessary. Microcode unit 304 also handles cache 301 misses.

Datapath circuitry 305 provides the main execution data path for microprocessor 300. Datapath circuitry 305 includes an arithmetic logic unit (ALU), control registers, a barrel shifter, read only memory (ROM) and flags. Datapath circuitry 305 retrieves data from prefetch buffers 302. Datapath circuitry 305 executes microcode provided by instruction decoder 303 using data received from prefetch buffers 302 according to the addresses generated by address generator 306. Floating point unit 307 is used in the execution of floating point instructions.

Outside of processing core 315, microprocessor 300 has bus interface unit (BIU) 308, a pad interface 311, and a clock generator 310. Bus interface unit 308 provides an interface between internal buses of microprocessor 300 and external buses that are used to fetch data and instructions from a memory of the computer system. Bus interface 308 has write buffers 309 that are used to store data to be transferred from microprocessor 300 to the rest of the computer system. Pad interface 311 provides a pin interface for control, address and data signals passed between microprocessor 300 and the rest of the computer system.

Clock generator 310 receives a system clock signal Clk_sys, which may be a system clock from a motherboard, and uses the Clk_sys to generate clock signals for microprocessor 300. Clock generator 310 furnishes a clock signal Clk_1X to bus interface unit 308 and pad interface 311. When microprocessor 300 is not overheating (as indicated by the deassertion of a signal from thermal sensor 321), the Clk_1X signal has the same frequency as the Clk_sys signal, and portions of bus interface unit 308 that interact with pad interface 311 use the Clk_1X signal.

Clock generator 310 furnishes another clock signal Clk_Internal to processing core 315. The Clk_Internal signal is synchronized to the Clk_sys signal and has a frequency that is a multiple (e.g., a multiple of two) of the frequency of the Clk_sys signal. As a result, when microprocessor 300 is operating under normal conditions, processing core 315 generally operates at a higher frequency than the rest of the computer system.

Control logic 312 of clock generator 310 receives thermal trip signal from thermal sensor 321. When the thermal trip signal is asserted, control logic 312, depending on its configuration, may alter the frequency of the Clk_Internal signal to slow down processing core 315 and reduce thermal buildup in the substrate of microprocessor 300. In this manner, when the thermal trip signal is asserted, control logic 312 either throttles back the frequency of the Clk_Internal signal or temporarily halts the Clk_Internal signal.

In addition, according to one embodiment, microcode unit 304 may include a specific instruction (e.g., an operand) which, when called, may be provided to instruction decoder 303 to carry out the corresponding operations. For example, after a user of a system issues a request to upgrade a clock speed of processor 300 and receives an encrypted command for programming the clock speed, microcode unit 304 is called to provide an instruction to instruction decoder 303. Instruction decoder 303 executes the instruction received from microcode unit 304 to insert the encrypted command to a decryption engine (not shown). The decryption engine then decrypts the command to extract a programming code. The decryption engine may access speed key information which may be embedded within processor 300 (e.g., ROM) to ensure that the programming code is valid. If the programming code is valid, the decryption engine may communicate with clock control logic 312, which may include a PLL circuit, to control clock generator 310, based on the programming code, to generate proper clock signals, such as clock signals Clk_1X and Clk_Internal.

Figure 4:
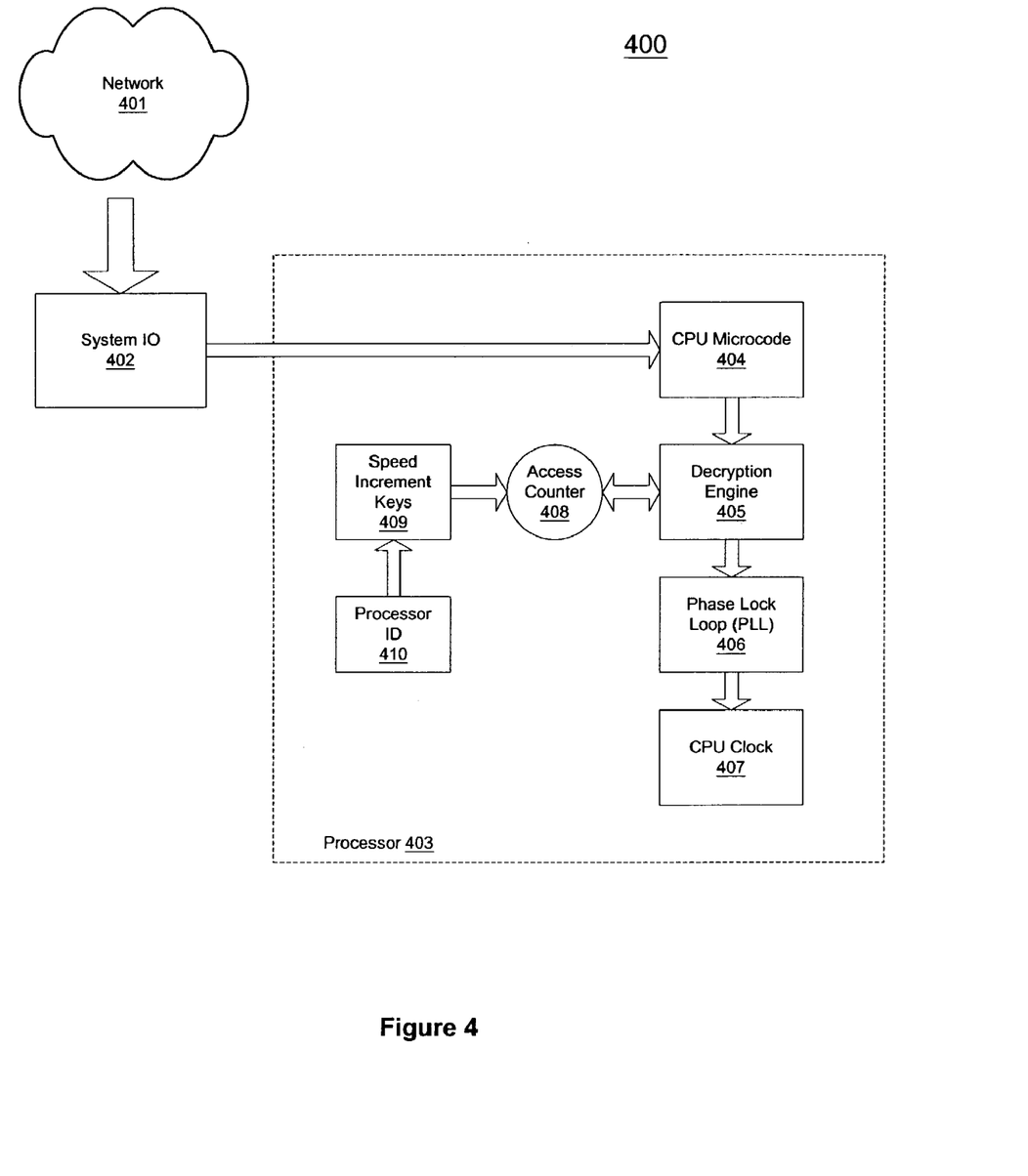
FIG. 4 illustrates a block diagram of a computer system according to another embodiment.

FIG. 4 is a block diagram illustrating an embodiment of a computer system having a microprocessor whose clock speed or a functionality may be remotely programmed. In one embodiment, exemplary system 400 includes an interface to receive a command for programming a clock speed of an integrated circuit (IC) from a remote facility over a network, and a programming engine coupled to the interface to program the clock speed of the IC based on the command.

Referring to FIG. 4, system 400 includes a processor 403 coupled to a system input/output (IO) interface 402 to access to a network 401. Processor 403 may be used as processor 203 of system 200 shown in FIG. 2. System IO 402 may include one or more IO devices, such as devices 210 of system 200. Particularly, system IO 402 may include a network interface card (NIC) or a modem to access network 401. Processor 403 may be a Pentium processor from Intel Corporation. Alternatively, processor 403 may be PowerPC processor from Motorola, Inc. Network 401 may be a wide area network (WAN), such as an Internet. Alternatively, network 401 may be a local area network (LAN) or an Intranet.

In one embodiment, processor 403 includes, among others, CPU microcode unit 404, decryption engine 405, phase-lock-loop (PLL) circuit 406, clock generator 407, access counter 408, speed keys 409, and processor identification (ID) 410. According to one embodiment, a user who operates system 400 may issue a request to upgrade its processor 403 clock speed to a system manufacture facility or a third party support facility over network 401. The facility may be maintained by the respective vendor at a Web site, such as Web server system 128 of FIG. 1. Alternatively, the facility may be a corporate headquarter (e.g., an IT department) through an Intranet. The request may include processor ID 410 to indicate a type of processor 403. In one embodiment, the user may access the facility using an application, such as, for example, a utility application provided by the manufacturer. Alternatively, the user may just use an Internet browser to issue the request to the manufacture Web site through HTTP (hypertext transfer protocol) protocol. In addition, the facility may require the user to pay for a charge of the upgrade over the network via an e-Commerce mechanism.

Upon paying for the upgrade, the facility releases a command to allow system 400 to download from the facility over network 401. In one embodiment, the command includes an encrypted programming code with an encryption algorithm, which may be well known in the art. Once the application (not shown) running at an application level of system 400 receives the command via system IO 402, the application may access, through an application-programming interface (API), microcode section 404. According to one embodiment, microcode section 404 may be previously enabled with an instruction (e.g., an operand) to specifically handle the command. In one embodiment, microcode 404 may include one or more memory or IO mapped registers to allow an application, such as a browser or other upgrading utility applications, to directly access microcode unit 404. In an alternatively embodiment, the application may access microcode unit 404 via a device driver specifically developed for microcode unit 404. The device driver may ultimately communicate with BIOS (basic input/output system) to access microcode unit 404. In further embodiment, the application may communicate directly with the BIOS to access microcode unit 404.

According to one embodiment, the command downloaded is encrypted with an encryption algorithm which may be commercially available in the market. Once microcode unit 404 receives the command from the application, microcode unit 404 may a specific instruction to an instruction decoder, such as instruction decoder 303 of FIG. 3, to pass or insert the command to decryption engine 405. Decryption engine 405 decrypts the command to retrieve the programming code to program PLL circuit 406. Prior to programming PLL circuit 406, decryption engine 405 may access speed key 409 to retrieve an embedded speed key 409, as well as processor ID 410, through access counter 408. Decryption engine 405 then compares the programming code with speed key 409 to determine whether the programming code is valid. The comparison may also examine processor ID 410 to determine whether processor 403 can support such clock speed specified by the programming code. Speed key 409 and processor ID 410 may be stored in a memory, such as a ROM (read-only memory), within processor 403. Alternatively, speed key 409 and processor ID 410 may be hardwired in a logic circuit, such as a fuse circuit, during manufacturing. If decryption engine 405 decides that the programming code is valid, decryption engine 405 may program PLL 406 to control clock generator 407 to generate a desired clock speed accordingly.

According to one embodiment, accessing speed key unit 409 is gated by access counter 408. If decryption engine 405 fails to access speed key unit 409 for a predetermined number of attempts, access counter 408 may disable the remote clock speed adjustment functionality, temporarily or permanently.

According to another embodiment, the command received from a facility over network 401 may be encrypted with a public/private key pair. That is, the command is encrypted with a public key at the facility and is transmitted over to system 400 over network 401. According to one embodiment, a private key is embedded in speed key unit 409. When decryption engine 405 accesses speed key unit 409, decryption engine 405 retrieves the private key and uses the private key to decrypt the command which has been encrypted by the public key. As a result, the whole transaction is secured. Other encryption protocols or algorithms may be utilized.

Figure 5:
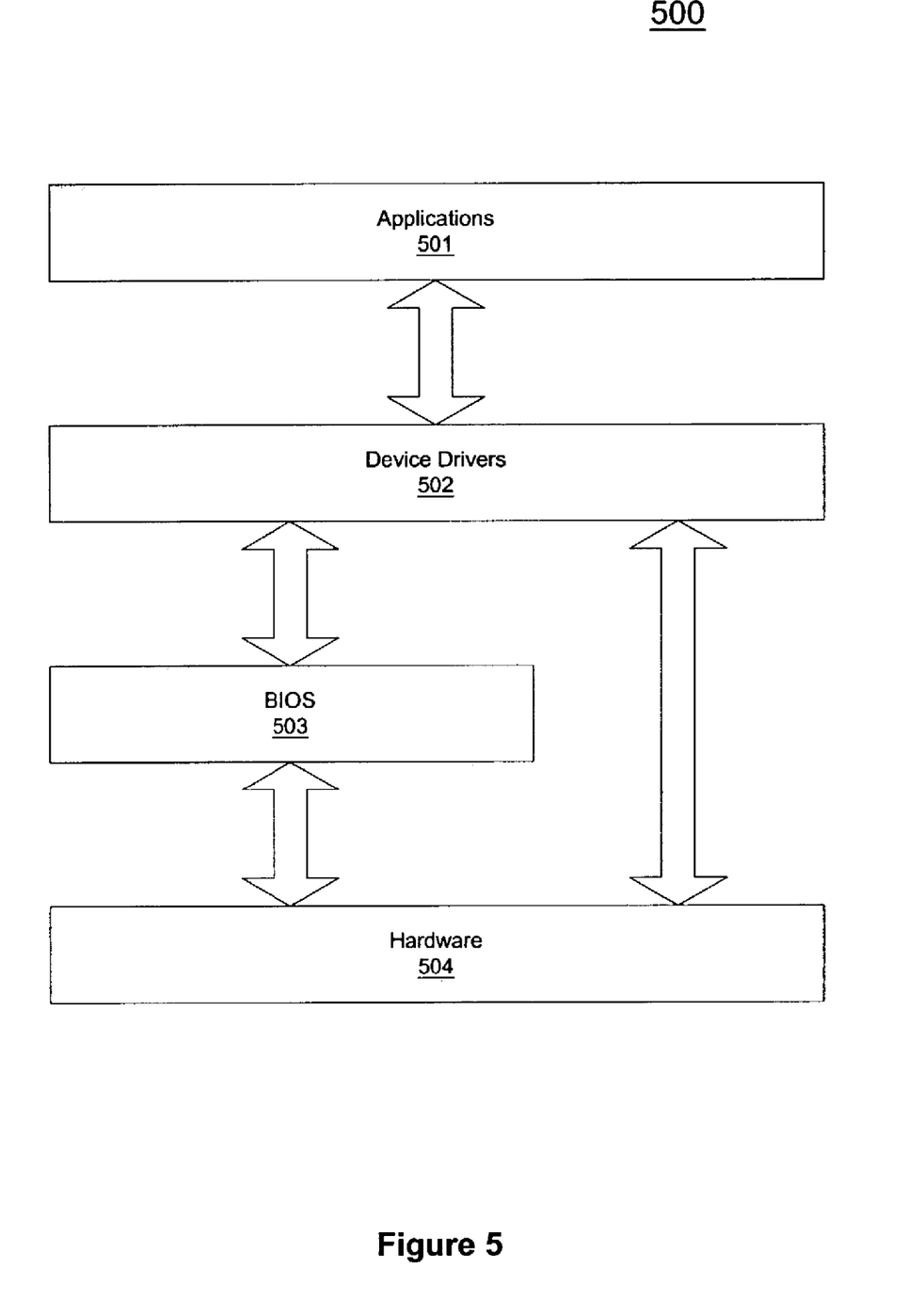
FIG. 5 illustrates a block diagram of an embodiment of a system architecture.

FIG. 5 is a block diagram illustrating an embodiment of an architecture, which may be used to remotely program a clock speed of an IC (e.g., a microprocessor). In one embodiment, exemplary architecture 500 includes, among others, applications 501, device drivers 502, BIOS 503, and hardware 504. Applications 501 may communicate one or more device drivers 502 through an application programming interface (API) provided by the operating system (OS) or the device drivers. Device drivers 502 may access hardware (e.g., a processor) via BIOS 503 to program the hardware to perform certain operations. Alternatively, device drivers 502 may directly communicate with hardware 504 via a memory or IO mapped interface.

Applications 501 may reside in a user space of the OS. Device drivers 502 may reside in a kernel space of the OS, while BIOS 503 may reside in a firmware (e.g., ROM) within next to hardware 504. The OS may be a Windows operating system from Microsoft Corporation. Alternatively, the OS may be a Mac OS from Apple Computer, Inc. Further, the OS may be a Unix or a Linux operating system. Other operating systems, such as real-time operating system embedded in a set-top box type computer, may be utilized.

Applications 501 may include, according to one embodiment, a browser to access a manufacture facility, such as a Web server system 128, over a network, such as Internet 122. Particularly, when a user wishes to access a remote manufacture facility, the user uses a browser which resides in application level 501 to communicate with a device driver of a network interface, such as a network driver which resides at device drivers' level 502. The network driver then communicates with hardware 504 which may include a NIC card to access the manufacture facility over a network. Alternatively, the user may use a special utility application provided by the vendor to access the facility via dial-up networking mechanism using a modem.

Upon receiving a command from the facility, the command may be forwarded to a decryption engine, such as decryption engine 405, which may reside in device drivers 502, BIOS 503, or embedded in hardware 504. The decryption engine may be implemented in software or in hardware. The decryption engine then decrypts the command against one or more speed keys, such as speed keys 409 to ensure that the programming code extracted is valid. If the programming code is valid, the decryption engine may program the respective PLL circuit to control a clock generator to generate proper clock signals.

Figure 6:
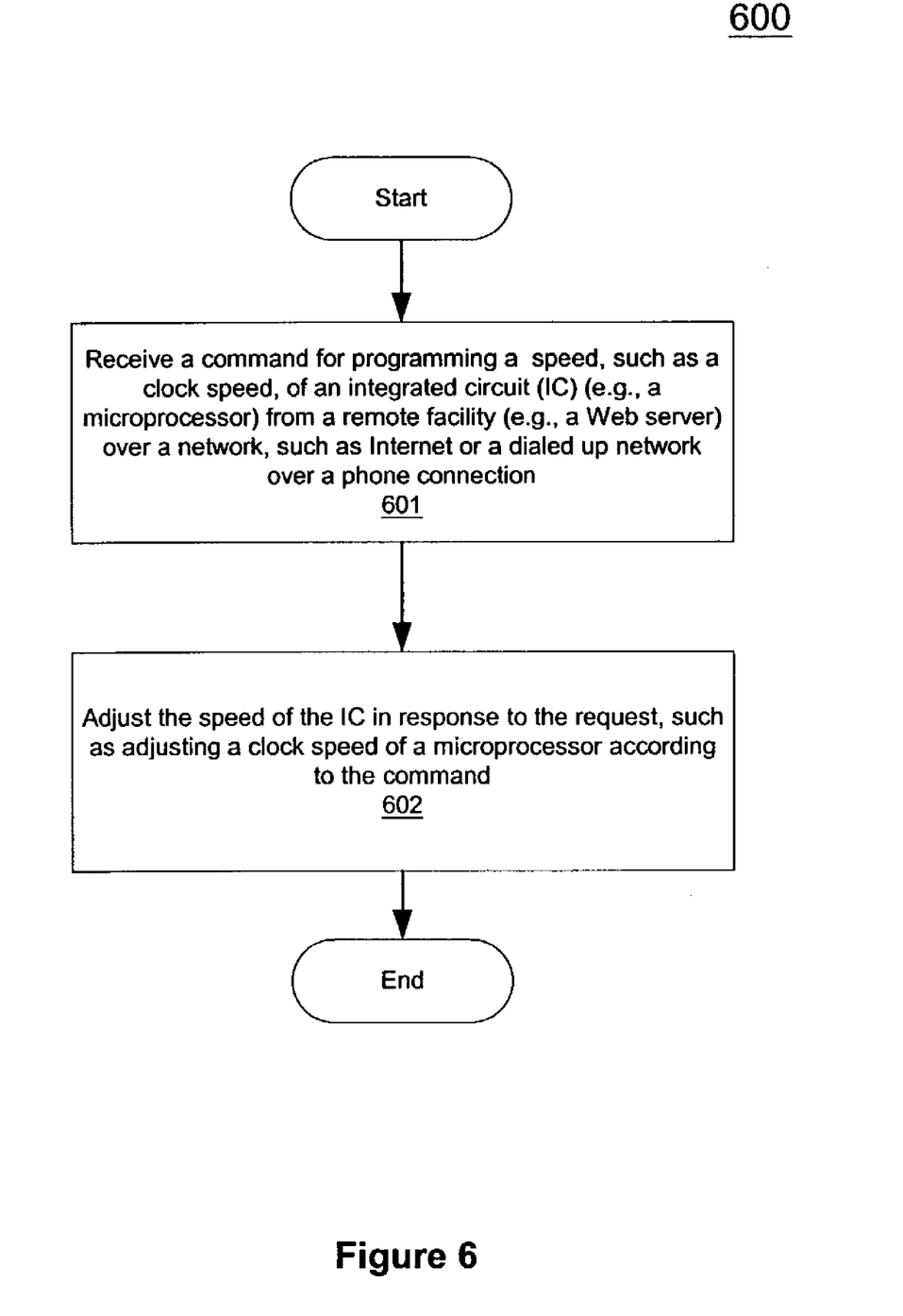
FIG. 6 is a flow diagram illustrating an embodiment of a process to remotely program a clock speed of an integrated circuit (IC).

FIG. 6 is a flow diagram illustrating an embodiment of a process to remotely program a clock speed of an IC. In one embodiment, exemplary process 600 includes receiving a command for programming a clock speed of an integrated circuit (IC) from a remote facility over a network, and adjusting the clock speed of the IC in response to the command. Referring to FIG. 6, after a user issues a request to a remote facility for upgrading its clock speed of an IC (e.g., a microprocessor of a computer system) over a network (e.g., an Internet), at block 601, the user receives a command for programming a clock speed of the IC from the remote facility over the network. In response to the command, at block 602, the system adjusts the clock speed of the IC based on the command.

Figure 7:
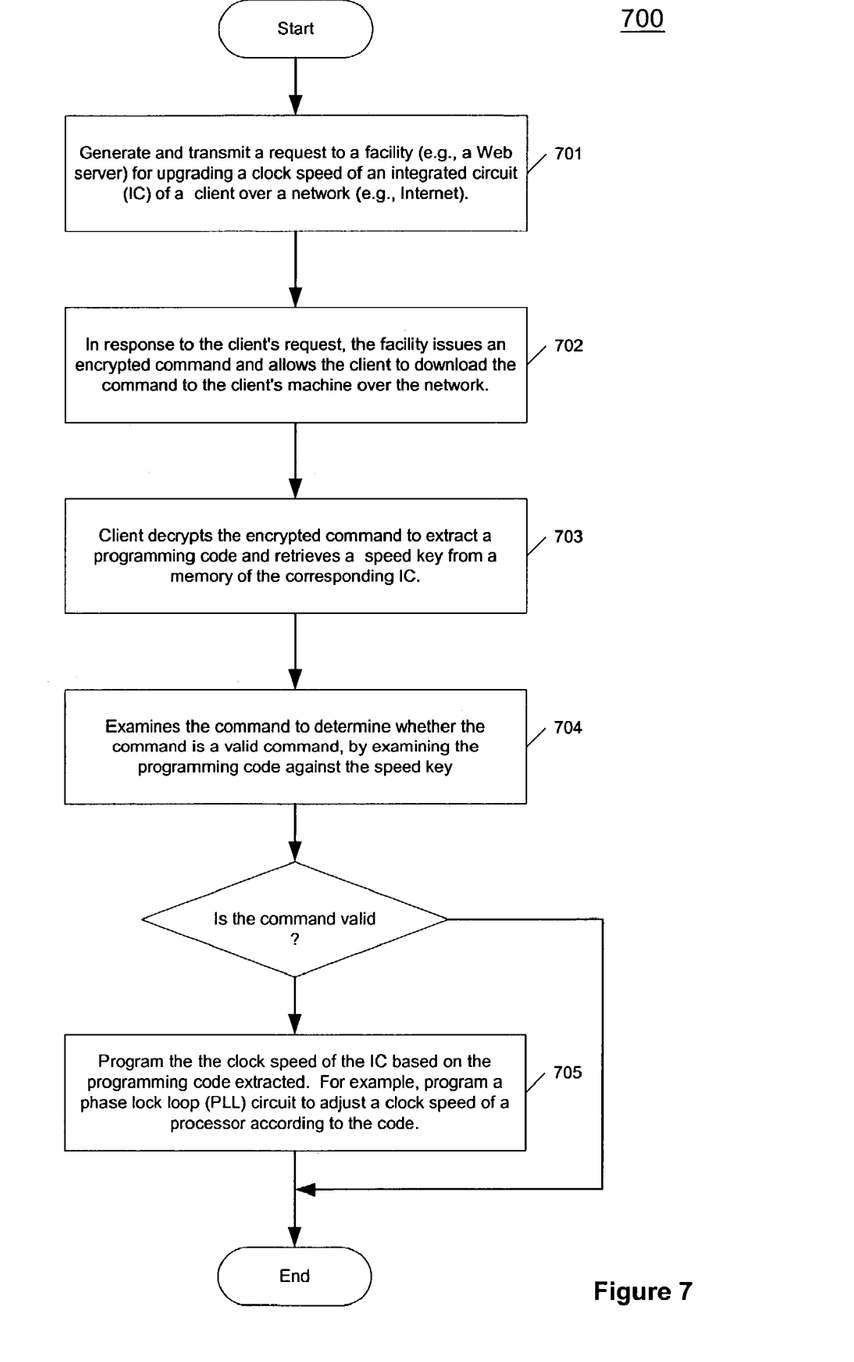
FIG. 7 is a flow diagram illustrating another embodiment of a process to remotely program a clock speed of an integrated circuit (IC).

FIG. 7 is a flow diagram illustrating another embodiment of a process to remotely program a clock speed of an IC. In one embodiment, the exemplary process 700 starts, at block 701, to generate and transmit a request to a facility, such as a Web server 128 maintained by a manufacturer, for upgrading a clock speed of an IC of a client over a network (e.g., an Internet). In response to the client's request, at block 702, the facility issues an encrypted command to program the clock speed requested and allows the client to download the encrypted command to the client's machine over the network. At block 703, the client decrypts the command to extract a programming code and retrieves a speed key from a memory of the corresponding IC. At block 704, the client examines the programming code against the speed key to determine whether the programming code is valid. If the programming code is valid, at block 705, the client adjusts the clock speed of the IC (e.g., a microprocessor) based on the programming code. In one embodiment, the client programs a PLL circuit to control a clock generator to generate desirable clock signal based on the programming code.

Although the techniques described above relate to programming a clock speed of an IC, it will be appreciated that the techniques are not limited to programming a clock speed. The techniques may be applied to other remotely programmable features of an IC or a data processing system. For example, according to one embodiment, a cache memory of a microprocessor (e.g., cache 301) or a data processing system (e.g., cache 204) may be remotely enabled or programmed. Alternatively, a portion of a logic, such as core logic of a processor (e.g., core logic 315 of microprocessor 300), may be remotely programmed or enabled. Other functionalities apparent to one with ordinary skill in the art may be remotely programmed via one of the above techniques described.

Figure 8:
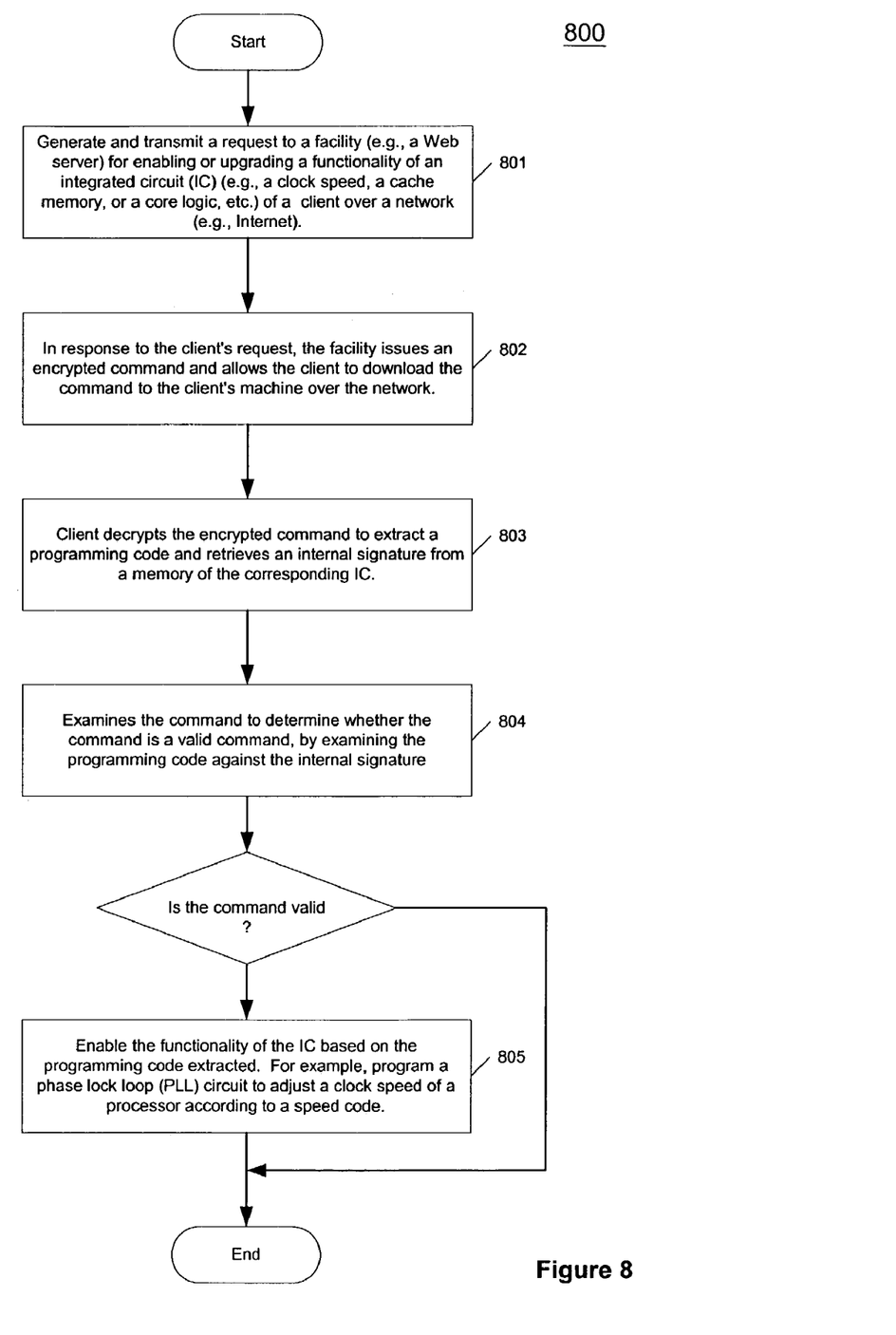
FIG. 8 is a flow diagram illustrating an embodiment of a process to remotely enable a functionality of an integrated circuit (IC).

FIG. 8 is a flow diagram illustrating another embodiment of a process to remotely program a functionality of an IC. In one embodiment, exemplary process 800 includes receiving a command for enabling a functionality of an integrated circuit (IC) from a remote facility over a network and enabling the functionality of the IC in response to the command. In one embodiment, the command is received via an eCommerce channel, which may be hosted by a manufacturer of the IC or a third party distributor.

Referring to FIG. 8, the exemplary process 800 starts, at block 801, to generate and transmit a request to a facility, such as a Web server 128 maintained by a manufacturer, for upgrading a functionality of an IC of a client over a network (e.g., an Internet). In one embodiment, the functionality may include a clock speed capability, a cache memory, or a portion of a core logic, etc. In response to the client's request, at block 802, the facility issues an encrypted command to program the functionality requested and allows the client to download the encrypted command to the client's machine over the network. At block 803, the client decrypts the command to extract a programming code and retrieves an internal code or signature from a memory of the corresponding IC. At block 804, the client examines the programming code against the internal code to determine whether the programming code is valid. If the programming code is valid, at block 805, the client program the corresponding functionality of the IC (e.g., a clock speed, a cache memory, a portion of a core logic) based on the programming code. In one embodiment, the client programs a PLL circuit to control a clock generator to generate desirable clock signal based on the programming code. Other functionalities apparent to one with ordinary skill in the art may be remotely programmed via one of the above techniques described.

Thus, foregoing described embodiments enable a vendor to under-clock high performance CPU product and sell at discounted lower performance prices. Subsequently, as time and end user demands for performance increase, the vendor can repeatedly offer higher CPU speed increments remotely, for a small premium. How much of a premium depends upon the expected "final" selling cost of the CPU, how many CPU speed increments are incorporated into the CPU (and thus, the number of premium's charged), and the time value of money. It will be appreciated that other features of the CPU, such as cache memory or a portion of logic, may be remotely upgraded or enabled. With the technologies described above, adjustments may be made remotely, automatically, securely, and "on-the-fly".

For instance, an example of a high performance processor might be a microprocessor at 866 MHz that may be sold for about $100. This device would be way too pricey for a "new" price sensitive consumer product. But with the technology described in the embodiments above, a vendor can actually sell this product in a market segment that traditionally has lower prices. The vendor then could clock that device down to, for example, 300 MHz and sell it to a customer for, for example, $30. In a year, the vendor can offer a performance increase to 466 MHz for, for example, $30 (this time, the fee might actually be paid by the end user). The offer, as well as the performance increased, would all be done remotely and automatically via a common e-Commerce mechanism, such that the end user does not need to physically return the device for upgrade. A year later, the same vendor could offer a performance increase to 633 MHz for, for example, another $30. And finally, still another year later the vendor could offer a performance increase to 866 MHz for a final fee, such as, for example, another $30. Therefore, the final selling price for the chip is $120 over a three years period.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   transmitting a request for adjusting a clock speed of an integrated circuit (IC) to a remote facility over a network;
   tendering a payment associated with the request to exchange for a command for programming a clock speed of the IC;
   receiving the command from the remote facility over a network, the remote facility being a computer server; and
   adjusting the clock speed of the IC in response to the command.

2. The method of claim 1, wherein the network is a wide area network (WAN) or a local area network (LAN).

3. The method of claim 1, wherein the command comprises an encrypted programming code for program the clock speed of the IC, wherein the method further comprises decrypting the programming code.

4. The method of claim 3, further comprising attempting to match the decrypted programming code with a speed code within the IC to determine whether the programming code is valid.

5. The method of claim 4, further comprising programming a phase-lock-loop (PLL) circuit to adjust the clock speed of the IC based on the programming code if the programming code is valid.

6. The method of claim 4, further comprising examining the programming code to determined whether the programming code is valid against an identification (ID) of the IC.

7. The method of claim 4, further comprising rejecting the programming code if the programming code does not match with the speed code.

8. The method of claim 7, further comprising disabling an ability to program the clock speed of the IC if the attempting is performed more than a predetermined number of chances.

9. An apparatus, comprising:
   an interface to transmit a request for adjusting a clock speed of an integrated circuit (IC) to a remote facility over a network, to tender a payment associated with the request to exchange for a command for programming a clock speed of the IC, and to receive the command from a remote facility over a network, the remote facility being a computer server; and
   a programming engine coupled to the interface to program the clock speed of the IC based on the command.

10. The apparatus of claim 9, further comprising a microcode unit to receive the command from the interface.

11. The apparatus of claim 10, wherein the command includes an encrypted programming code for programming a clock speed of the IC the apparatus further comprises a decryption engine coupled to the microcode unit to decrypt the programming code.

12. The apparatus of claim 11, further comprising a phase-lock-loop (PLL) circuit to receive a speed code from the decryption engine to program a clock circuit of the IC to achieve a desirable clock speed.

13. The apparatus of claim 11, further comprises one or more speed keys to allow the decryption engine to match the programming code with the one or more speed keys to determine whether the programming code is valid.

14. The apparatus of claim 13, wherein the programming code is matched with the one or more speed keys based on an identification (ID) of the IC.

15. The apparatus of claim 9, wherein the network is a wide area network (WAN) or a local area network (LAN).

16. A computer-readable medium having stored therein executable code, which when executed by a computer, cause the computer to perform following operations:
   transmitting a request for adiusting a clock speed of an integrated circuit (IC) to a remote facility over a network;
   tendering a payment associated with the request to exchange for a command for programming a clock speed of the IC;
   receiving the command from a remote facility over a network, the remote facility being a computer server; and
   adjusting the clock speed of the IC in response to the command.

17. The computer-readable medium of claim 16, wherein the network is a wide area network (WAN) or a local area network (LAN).

18. The computer-readable medium of claim 16, wherein the command comprises an encrypted programming code for program the clock speed of an integrated circuit (IC), wherein the method further comprises decrypting the programming code.

19. The machine-readable medium of claim 18, wherein the method further comprises attempting to match the decrypted programming code with a speed code within the IC to determine whether the programming code is valid.

20. The machine-readable medium of claim 19, wherein the method further comprises programming a phase-lock-loop (PLL) to adjust the clock speed of the IC based on the programming code if the programming code is valid.

21. The machine-readable medium of claim 19, wherein the method further comprises examining the programming code to determined whether the programming code is valid against an identification (ID) of the IC.

22. The machine-readable medium of claim 19, wherein the method further comprises rejecting the programming code if the programming code does not match with the speed code.

23. The machine-readable medium of claim 22, wherein the method further comprises disabling an ability to program the clock speed of the IC if the attempting is performed more than a predetermined number of chances.

24. A method, comprising:
   transmitting a request for adjusting a clock speed of an integrated circuit (IC) to a remote facility over a network;

tendering a payment associated with the request to exchange for a command for programming a clock speed of the IC;

receiving the command from a remote facility over a network, the remote facility being a computer server; and enabling the functionality of the IC in response to the command.

25. The method of claim 24, wherein the command is received via an eCommerce mechanism over the network.

26. The method of claim 24, wherein the functionality of the IC is member selected from the group consisting of:

a clock speed capability;

a cache memory; and at least a portion of a core logic.

27. A data processing system, comprising:

a processor; and an interface to transmit a request for adjusting a functionality of the processor to a remote facility over a network, to tender a payment associated with the request to exchange for a command for programming the functionality of the processor, and to receive the command from the remote facility over a network to enable the functionality of the processor, the remote facility being a computer server.

28. The data processing system of claim 27, further comprising a memory coupled to the processor and coupled to the interface, to store instwctions that causes the processor to perform operations, the operations including:

decrypting the command to retrieve a programming code;

matching the programming code with an internal signature to determine whether the programming code is valid; and programming a circuit to enable the functionality of the processor if the programming code is valid.

* * * * *

UNITED STATES PATENT AND TRADEMARK OFFICE
CERTIFICATE OF CORRECTION

| | |
|---|---|
| PATENT NO. | : 7,324,450 B2 |
| APPLICATION NO. | : 10/404784 |
| DATED | : January 29, 2008 |
| INVENTOR(S) | : Oliver |

It is certified that error appears in the above-identified patent and that said Letters Patent is hereby corrected as shown below:

In column 14, at line 9, delete "instwctions" and insert --instructions--.

Signed and Sealed this

Twenty-sixth Day of August, 2008

JON W. DUDAS
*Director of the United States Patent and Trademark Office*